(12) United States Patent
Okamoto

(10) Patent No.: US 6,342,944 B1
(45) Date of Patent: Jan. 29, 2002

(54) VERTICAL ALIGNMENT TABLE MECHANISM

(75) Inventor: Atsushi Okamoto, Mishima (JP)

(73) Assignee: Howa Machinery, Ltd., Nagoya (JP)

( * ) Notice: Subject to any disclaimer, the term of this patent is extended or adjusted under 35 U.S.C. 154(b) by 0 days.

(21) Appl. No.: 09/510,757

(22) Filed: Feb. 22, 2000

(51) Int. Cl.$^7$ ............................................. G03B 27/62
(52) U.S. Cl. ............................. 355/72; 355/74; 355/76
(58) Field of Search .............................. 355/53, 72, 74, 355/75, 76; 248/576, 580

(56) References Cited

U.S. PATENT DOCUMENTS

| | | | |
|---|---|---|---|
| 5,530,516 A | * | 6/1996 | Sheets .......................... 355/53 |
| 5,923,409 A | * | 7/1999 | Hamada et al. ................ 355/72 |
| 6,211,945 B1 | * | 4/2001 | Baxter et al. .................. 355/75 |

\* cited by examiner

*Primary Examiner*—Alan A. Mathews
(74) *Attorney, Agent, or Firm*—Ladas & Parry

(57) ABSTRACT

A vertical alignment table mechanism 21 for a board 25 to form a printed wiring board has a vertical support wall 43, and an alignment table 33 disposed in vertical attitude opposite to the front surface of the support wall 43, having an opening in which an exposure mask 23 is disposed. The alignment table 33 is supported for movement in a vertical plane on the vertical support wall 43 by a means of plurality of table support devices 35. Each of the table support devices 35 includes a ball caster 51 fixed to the support wall 43 having a ball 51a therein and a contact block 53 fixed to the alignment table 33. A tension spring 55 urges the surface of the contact block 53 against the ball. Table moving devices 37 are also provided between the support wall 43 and the alignment table 33. Each table moving device 37 includes a contact block 85 on the alignment table, and a follower roller 83 on the support wall 43. A spring 37 urges the follower roller 83 against the contact block 85. A pulse motor 71 causes movement of the alignment table 33 relative to the support wall 35.

12 Claims, 5 Drawing Sheets

VERTICAL ALIGNMENT TABLE MECHANISM

BACKGROUND OF THE INVENTION

1. Field of the Invention

The present invention relates to a vertical alignment table mechanism and, more particularly, to a vertical alignment mechanism having an alignment table for holding an object to be exposed to light, such as a board for forming a printed wiring board, or an exposure mask, supported in vertical attitude.

2. Description of the Related Art

An etch-proof treatment of a conductive foil in a printed wiring board fabricating process exposes a precursory etching resist film to light through an exposure mask provided with an exposure pattern corresponding to a desired conductor pattern. The exposure mask and a board coated with the precursory etching resist film are aligned (registered) before exposing the precursory etching resist film to light. Generally, the board for a printed wiring board or the exposure mask is held by an alignment table capable of being moved for positional adjustment in a plane perpendicular to a direction in which the board and the exposure mask are arranged, and the alignment table is moved to align the board and the exposure mask with each other.

A variety of alignment table mechanisms for the alignment of the board and the exposure mask have been proposed. Basically, the alignment table mechanism is provided with an XYθ table and achieves the alignment of the board and the exposure mask by moving the alignment table while errors in the superposition of register marks formed on the board and the exposure mask are measured by cameras or the like.

Referring to FIG. 5 showing a prevalently used conventional horizontal alignment table mechanism as an example, there are shown a horizontal base plate 3 and an alignment table 5 for holding an exposure mask or the like. The alignment table 5 has the shape of a rectangular flat plate and is provided with a relatively large opening 5a for allowing light to pass therethrough, surrounded by a peripheral portion thereof. The alignment table 5 is supported for free horizontal movement on attached to the upper surface of the base plate 3. First and second actuators 9 are attached to the front side of the base plate 3 with their axes extended rearward. A third actuator 9 is attached to the right side of the base plate 3 with its axis extended toward the left. The first, second and third actuators 9 are electric actuators provided with linearly moving operating rods 9a, respectively.

First and second guide rails 11 are attached to the front side of the alignment table 5, and a third guide rail 11 is attached to the right side of the alignment table 5. Sliders 13 are attached to the guide rails 11, respectively. Free end portions of the operating rods 9a are joined to the sliders 13 by universal joints 15, respectively. The third actuator 9 is driven to move the alignment table 5 rightward or leftward. The first and second actuators 9 are operated to move the alignment table forward or backward. Either the first or the second actuator 9 is operated to turn the alignment table 5 in a horizontal plane.

The overall size of the conventional alignment table mechanism 1 is large, for the size of the alignment table 5 because the actuators 9 project outward greatly from the periphery of the alignment table 5. If it is necessary for the actuators 9 to move the alignment table 5 to locate the alignment table 5 with accuracy on the order of micrometers, plays in the joints of the actuators 9 and the alignment table 5 including joining parts of the guide rails 11 and the sliders 13, and joining parts of the sliders 13 and the operating rods 9a, must infinitely be close to zero and, at the same time, the actuators 9 must be constructed in a precision that does not permit any backlash.

Although not shown in FIG. 5, actually, the actuator 9 is highly precision device including a pulse motor as a driving means, a ball screw, a coupling, and complicated precision bearings for supporting those components. Therefore, actuators 9 and the joints joining the actuators 9 to the alignment table 5 are expensive.

When an exposure implement, such as an exposure mask is used in vertical attitude with the intention of avoiding the adverse influence of dust, a vertical alignment table mechanism 1 as shown in FIG. 6 must be used. The vertical alignment table mechanism 1 needs a holding mechanism 17 to support the alignment table 5 between, for example, sliding bearings set in contact with the opposite major surfaces of the alignment table 5, respectively.

When the holding mechanism 17 is employed, the vertical alignment table mechanism 1 has a big depth and the external dimensions of the alignment table 5 must be increased for engagement with the holding mechanism 17. Consequently, the size of the vertical alignment table mechanism 1 increases. Generally, the alignment table 5 held by the holding mechanism 17 is unable to move smoothly and it is very difficult to eliminate backlashes in the holding mechanism 17. Part of the holding mechanism 17 projects on the front side of the alignment table 5, obstructs the movement of the alignment table 5 relative to an object with which the position of the alignment table 5 is to be adjusted, and places restrictions on the freedom of designing the alignment table mechanism 1 and the peripheral mechanisms.

The present invention has been made in view of the foregoing problems and it is therefore an object of the present invention to provide an inexpensive, compact vertical alignment table mechanism capable of achieving precision alignment.

SUMMARY OF THE INVENTION

According to the present invention, a vertical alignment table mechanism comprises: a vertical support wall; an alignment table disposed in a vertical attitude opposite to a front surface of the support wall, and having an exposure implement supporting region surrounded by a peripheral portion; a plurality of table support devices supporting the alignment table for movement in a vertical plane; and a plurality of table moving devices for moving the alignment table in directions parallel to two alignment directions perpendicular to each other; wherein each of the table support devices comprises an elastic member constantly biasing the alignment table toward the support wall, and a rolling member interposed between the support wall and the alignment table to allow the alignment table to move in the above directions.

In this alignment table mechanism, the alignment table is constantly pressed by an elastic members against the support wall through the rolling members so as to be movable. Therefore, there is no play at all in directions perpendicular to a vertical wall between the alignment table and the support wall.

Since the elastic members and the rolling members of the table support device do not project from the front surface of the alignment table on which the exposure implement is supported, the movement of the alignment table relative to an object with which the position of the alignment table is to be adjusted is not obstructed and hence the freedom of design of the alignment table mechanism and its associated mechanisms is increased greatly.

In this vertical alignment table mechanism according to the present invention, each of the table moving devices may comprise a pair of contact members attached to the support wall and the alignment table, respectively, so as to be in contact with each other, an elastic member for urging the contact members in contact with each other, and an actuator for moving one of the contact members toward and away from the other.

Thus, the alignment table does not have any play at all not only in the vertical plane but also with respect to alignment directions because the contact members are in pressed contact with each other at all times. Therefore, even if the actuator moves one of the contact members toward or away from the other in this state, the latter contact member follows the movement of the former to hold the alignment table with reliability, which insures a highly accurate alignment operation.

Since the elastic force urging the contact member on the side of the alignment table and the contact member on the side of the support wall in contact with each other serves as a preloading force acting on the operating rod of the actuator, the actuator need not be an expensive one incorporating complicated mechanisms for eliminating backlashes between its components and hence the manufacturing cost of the vertical alignment table mechanism is reduced accordingly.

In this vertical alignment table mechanism according to the present invention, the table support devices and the table moving devices may be disposed outside the exposure implement support region of the alignment table.

Since any portions of the table support devices and the table moving devices do not project to the outside or project scarcely to the outside from the alignment table, the vertical alignment table mechanism can be formed in a compact structure of dimensions corresponding to the necessary size of the alignment table; that is, the table support devices and the table moving devices do not require any large space for installation, the exposure implement support region, such as an opening, can be formed in a large size for the size of the alignment table.

The contact member driven for movement by the actuator may be attached to a free end part of the operating rod of the actuator or may be connected by an intermediate member to the free end part of the operating rod of the actuator. When the contact member is attached directly to the free end part of the operating rod, the table moving device can be formed in compact construction.

The above and other objects, features and advantages of the present invention will become more apparent from the following description taken in connection with the accompanying drawings.

DESCRIPTION OF THE PREFERRED EMBODIMENTS

Figure 1:
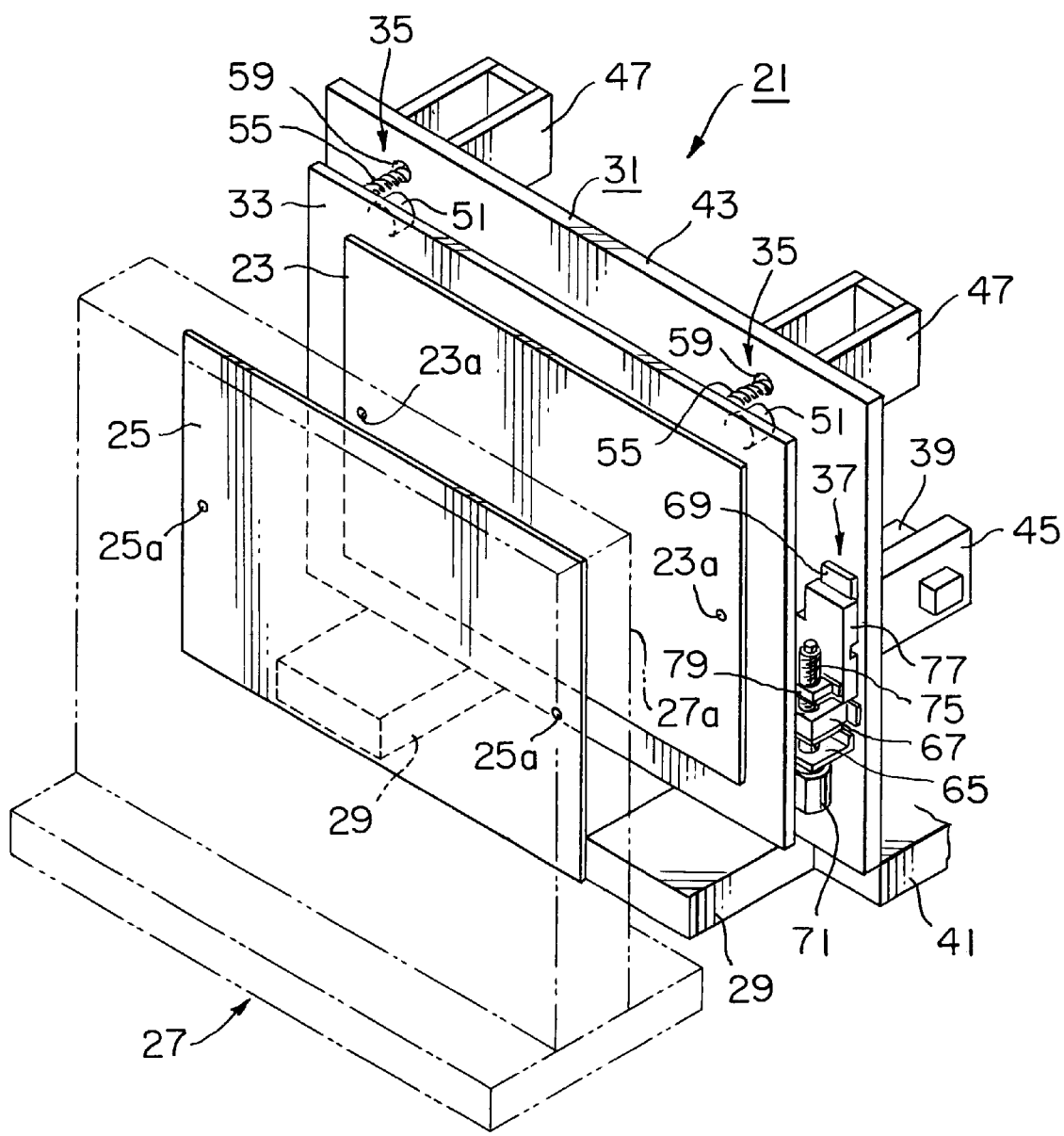
FIG. 1 is a perspective view of an essential part of a printed wiring board exposure apparatus employing a vertical alignment table mechanism in a preferred embodiment of the present invention.

A vertical alignment table mechanism in a preferred embodiment of the present invention is an alignment table mechanism 21 for holding an exposure mask 23 made of glass, incorporated into an exposure apparatus to be used for forming printed wiring boards. The exposure mask 23 is provided with a desired transparent pattern. The exposure mask 23 is provided with register marks 23a. The exposure mask 23 is held by an alignment table 33 included in the exposure mask alignment table mechanism 21. A board 25 on which a printed wiring pattern is to be formed is exposed to light through the exposure mask 23. The board 25 has a surface coated with an ultraviolet curable resist film and is provided with reference holes 25a for aligning the board 25 with the exposure mask 23.

A board holding base 27 is used for carrying the board 25 in a vertical attitude. The board holding base 27 has a vertical suction surface 27a on which the board 25 is held by suction. The board holding base 27 is movable between a delivery position where the board 25 is transferred from a conveyor to the board holding base 27 and vice versa, and an exposure position where the board 25 is disposed opposite to the exposure mask 23 and is exposed to light.

The alignment table mechanism 21 includes a base structure 31 supported for movement along guide rails 29, the alignment table 33 supported in vertical attitude on the base structure 31, four table support devices 35 supporting the alignment table 33 on the base structure 31, three table moving devices 37 for adjusting the position of the alignment table 33, and cameras 39 for detecting errors in the position of the alignment table 33. The exposure mask 23 provided with the desired exposure pattern is held detachably on the alignment table 33.

Figure 2:
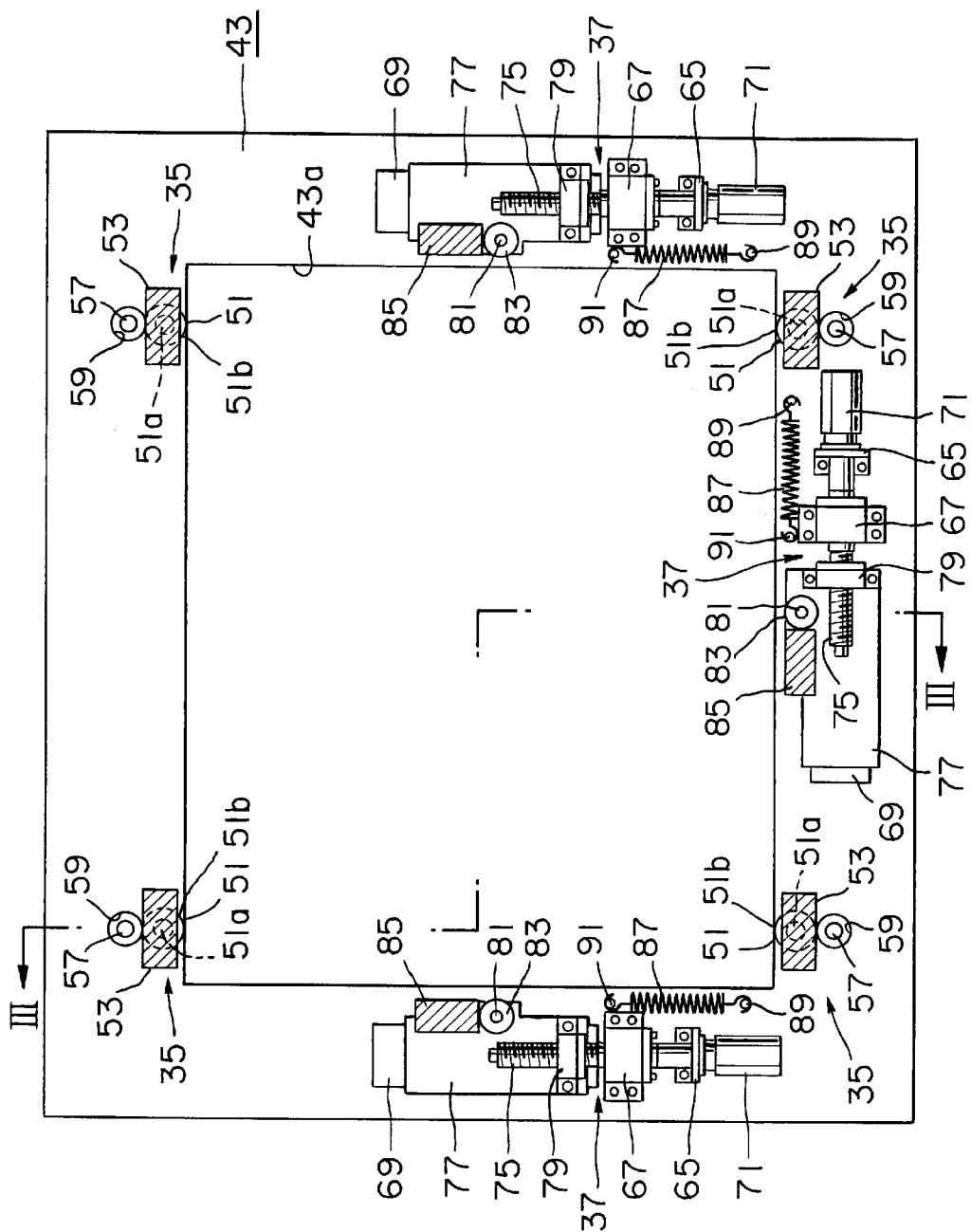
FIG. 2 is an enlarged sectional view taken on line II—II in FIG. 3 showing the vertical alignment table mechanism shown in FIG. 1.

The base structure 31 has a base member 41 supported on the guide rails 29 for movement along the guide rails 29, a relatively thick, flat support wall 43 vertically rising from the front end, i.e., lower left-hand end as viewed in FIG. 1, of the base member 41, camera brackets 45 projecting backward from middle portions of the right and left sides of the support wall 43, respectively, and spring connecting members 47 projecting backward from positions near the four corners of the support wall 43, respectively. As shown in FIG. 2, the support wall 43 is provided with an opening 43a similar in shape to the support wall 43 and smaller by one size than the support wall 43.

Figure 3:
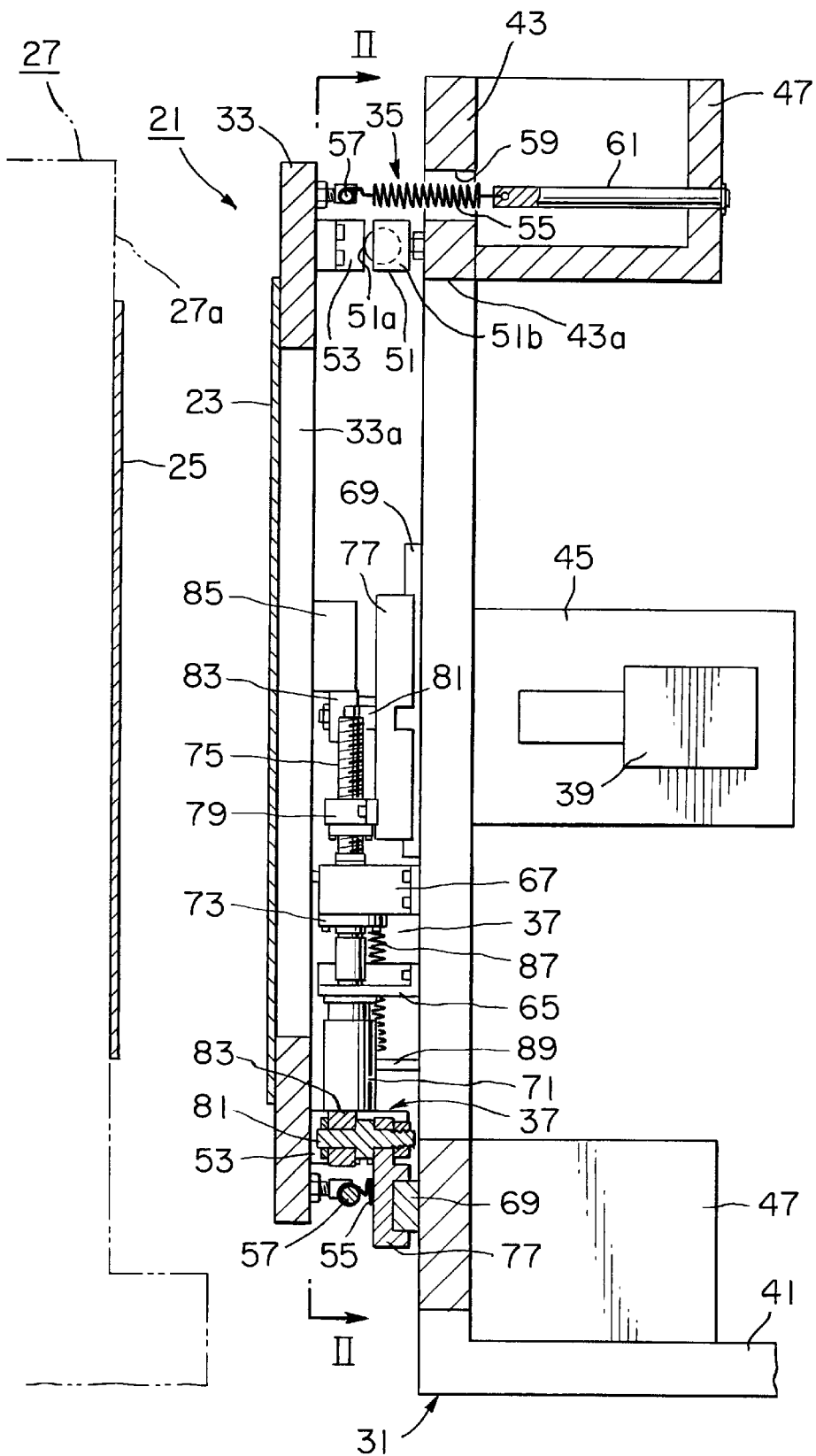
FIG. 3 is an enlarged sectional view taken on line III—III in FIG. 2 showing the vertical alignment table mechanism shown in FIG. 1.

The alignment table 33 has the shape of a rectangular frame formed by processing a flat plate smaller by one size than the support wall 43. As FIG. 3 shows, the alignment table 33 is provided with an opening 33a substantially the same in size as, or slightly smaller than the opening 43a. Thus, both the support wall 43 and the alignment table 33 has the shapes of rectangular frames, respectively.

Each of the four table support devices 35 has a ball caster 51 fixed to the support wall 43, a contact block 53 fixed to the alignment table 33, and a tension spring 55, i.e., an elastic member. The ball caster 51 includes a casing 51b and a ball 51a supported for rotation in the casing 51b via a plurality of minute balls not shown. The ball casters 51a are attached to the front surface of the support wall 43 at positions near the right and left ends of the upper and lower borders of the opening 43a, respectively. A part of the ball 51a protrudes forward from within the casing 51b. The contact blocks 53 are attached to the back surface of the alignment table 33 at positions near the right and left ends of the upper and lower borders of the opening 33a, respectively. Small spring engagement pegs 57 (FIG. 3) are attached to the alignment table 33 at positions on the upper side of the upper contact blocks 53 and on the lower side of the lower contact blocks 53, respectively.

Through holes 59 for allowing the tension springs 55 to extend therethrough are formed in the support wall 43 at positions near the ball casters 51 and corresponding to the spring housings 47, respectively. A spring tensioning rod 61 is extended forward from the back wall of each spring housing 47. The contact blocks 53 attached to the alignment table 33 are set in contact with the balls 51a of the ball casters 51, and each extension spring 55 is extended through the through hole 59 between the spring engagement peg 57 and the front end part of the spring tensioning rod 61 to bias the alignment table 33 toward the support wall 43 and to keep the contact blocks 53 in contact with the balls 51a of the ball casters 51.

The alignment table 33 is supported on the front surface of the support wall 43 in vertical attitude so as to be movable in a vertical plane on the balls 51a of the ball casters 51. The alignment table 33 has no play with respect to directions perpendicular to the vertical plane at all and does not move forward unless a forward force exceeding the resilience of the tension springs 55 is applied thereto.

The three table moving devices 37 are disposed in the space between the support wall 43 and the alignment table 33. The lower table moving device 37 is disposed on the lower side of the openings 33 and 43a, and the right and left table moving devices 37 are disposed on the right and left sides of the openings 33a and 43a, respectively. The lower table moving device 37 moves the alignment table 33 horizontally for horizontal alignment, and the right and left table moving devices 37 move the alignment table vertically for vertical alignment. The table support devices 35 and the table moving devices 37 are disposed outside a space corresponding to the opening 33a.

Figure 4:
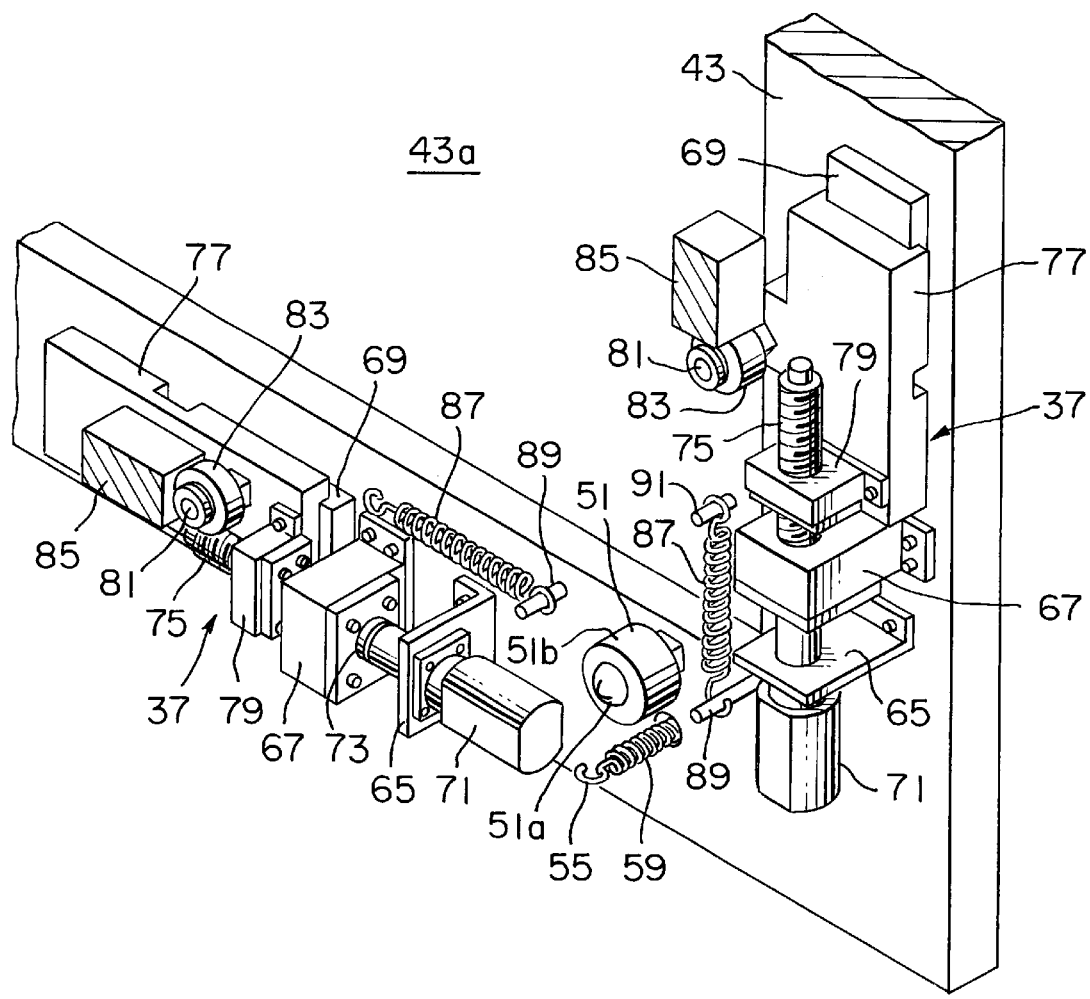
FIG. 4 is an enlarged perspective view of an essential part of the vertical alignment table mechanism shown in FIG. 1.
Figure 5:
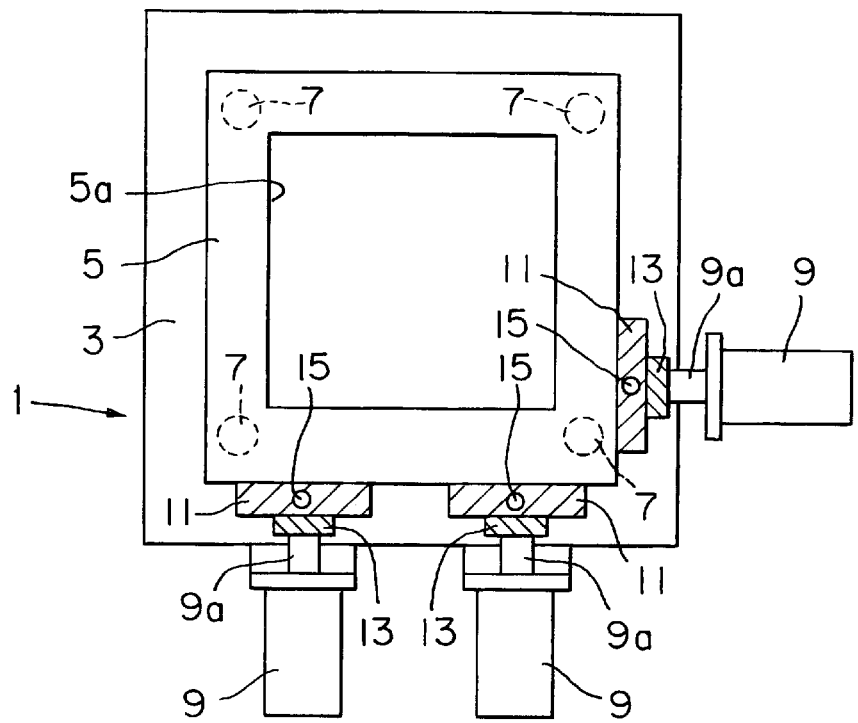
FIG. 5 is a plan view of a conventional horizontal alignment table mechanism.
Figure 6:
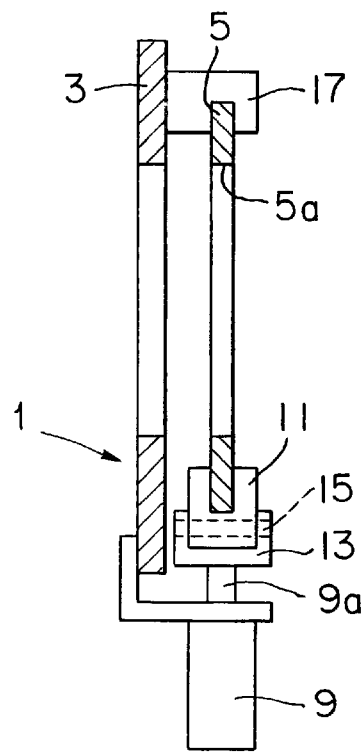
FIG. 6 is a sectional view of a conventional alignment table mechanism in a modification of the horizontal alignment table mechanism shown in FIG. 5.

The three table moving devices 37 are the same in construction. As most clearly shown in FIG. 4, each table moving device 37 has a motor bracket 65, a bearing housing 67 and a guide rail 69 arranged in that order on the front surface of the support wall 43 in the alignment directions in which the table moving device 37 moves the alignment table 33. The alignment directions for the lower table moving devices 37 are horizontal directions, and those for the right and left table moving device 37 are vertical directions. A pulse motor 71 is attached to the motor bracket 65. A bearing 73 is supported in the bearing housing 67. One end of a threaded rod 75 is connected to the output shaft of the pulse motor 71.

A sliding plate 77 is guided for movement in the alignment directions by the guide rail 69. A nut 79 is attached to one end of the sliding plate 77, and a roller support shaft 81 is attached to the other end of the sliding plate 77 so as to extend perpendicularly to the surface of the support wall 43. The threaded rod 75 is screwed in the nut 79, and a follower roller 83, i.e., a contact member, is supported for rotation on the roller support shaft 81. When the pulse motor 71 is operated, the nut 79 is moved in a direction corresponding to the rotating direction of the output shaft of the pulse motor 71 and thereby the follower roller 83 is moved in the same direction.

Three contact blocks 85 having the shape of a rectangular parallelepiped, i.e., contact members, are fixed to the back surface of the alignment table 33. The lower contact block 85 is fixed to a substantially horizontally middle portion of a section of the alignment table 33 extending under the opening 33a. The right end surface of the lower contact block 85 faces the follower roller 83 of the lower table moving device 37 from the left side.

The right and left contact blocks 85 are fixed to substantially vertically middle portions of sections of the alignment table 33 extending on the right and left sides of the opening 33a, respectively. The lower end surfaces of the right and left contact blocks 85 face the follower rollers 83 of the right and left table moving devices 37 from the upper side, respectively. The blocks 85 are kept in elastic contact with the corresponding follower rollers 83 by the resilience of tension springs 87, respectively. Each of the table moving devices 37 has the tension spring 87 extended along the borders of the openings 33a and 43a in the alignment direction, and the tension spring 87 is extended between a spring engagement peg 89 fixed to the support wall 43 and a spring engagement peg 91 fixed to the alignment table 33. Thus, the alignment table 33 is biased rightward by the lower tension spring 87, and the lower contact block 85 is kept in elastic contact with the follower roller 83 of the lower table moving device 37 at all times by the pulling force of the lower tension spring 87. The alignment table 33 is biased downward by the right and left tension spring 87, and the right and left contact blocks 85 are kept in elastic contact with the follower rollers 83 of the right and left table moving devices 37 at all times by the pulling forces of the right and left tension springs 87.

Thus, the alignment table 33 is held at a desired position in a vertical plane by the follower rollers 83 in elastic contact with the contact blocks 85, respectively. When the pulse motor 71 of the lower table moving device 37 is operated so that the output shaft thereof rotates in one direction, the follower roller 83 is moved to the left and pushes the contact block 85 to the left against the pulling force of the tension spring to move the alignment table to the left. When the pulse motor 71 of the lower table moving device 37 is operated so that the output shaft thereof rotates in the opposite direction, the follower roller 83 is moved to the right, and the contact block 85 is moved to the right so as to follow the follower roller 83 by the pulling force of the tension spring to move the alignment table to the right. When the alignment table is thus moved horizontally, the follower rollers 83 of the right and left table moving devices 37 roll along the lower end surfaces of the corresponding contact blocks 85, respectively.

The right and left table moving devices 37 operate similarly; the alignment table 33 is moved upward when the pulse motors 71 of the right and left table moving devices 37 are operated so that the output shafts thereof rotate in one direction and is moved downward when the same pulse motors 71 are operated so that the output shafts thereof rotate in the opposite directions. When the alignment table is thus moved vertically, the follower roller 83 of the lower table moving device 37 rolls along the right end surfaces of the corresponding contact block 85.

Since the alignment table 33 is biased toward the support wall 43 at all times independently of whether the alignment table 33 is moving or not moving, there is no play at all between the alignment table 33 and the support wall 43, and smooth movement of the alignment table 33 relative to the support wall 43 is ensured because the follower rollers 83 rolls along the contact blocks 85 and the contact blocks 53 move on the ball casters 51.

A suction groove, not shown, is formed in the front surface of the alignment table 33 so as to surround the opening 33a. A peripheral portion of the exposure mask 23 is attracted to the front surface of the alignment table 33 by a suction produced in the suction groove to hold the exposure mask 23 on the alignment table 33.

The cameras 39 are CCD cameras. Each camera 39 is mounted on a camera moving mechanism, not shown, supported on the camera bracket 45 and is moved between a waiting position outside the openings 33a and 43a, and a detection position where the optical axis of the lens thereof is aligned with a register mark formed on the exposure mask 23.

Operations for aligning the exposure mask 23 with the board 25 and exposing the board 25 through the exposure mask 23 to light will be described hereafter. When the board holding base 27 holding the board 25 is located at an exposure position, the alignment table mechanism 21 is advanced toward the board holding base 27 to bring the exposure mask 23 into contact with the board 25. The positions of the reference holes 25a of the board 25 relative to the register marks 23a of the exposure mask 23 are detected by the cameras 39, and the dislocations of the reference holes 25a of the board 25 from the corresponding register marks 23a of the exposure mask 23 are calculated. Then, the alignment table mechanism 21 is moved slightly away from the exposure mask 23, the stepping motors 71 are operated to move the alignment table 33 holding the exposure mask 23 in a vertical plane so that the register marks 23a of the exposure mask 23 are aligned with the reference holes 25a of the board 25. This aligning operation is continued until the dislocations of the register marks 23a from the corresponding reference holes 25a of the board 25 are reduced to values in an allowable range.

Then, the alignment table mechanism 21 is advanced to bring the exposure mask 23 into contact with the board 25, the cameras 39 are returned to their waiting positions, an exposure lamp, not shown, disposed behind the support wall 43 is turned on to irradiate the board 25 through the exposure mask 23 with ultraviolet rays.

Although the present invention has been described in its preferred embodiment, the present invention is not limited in its practical application to those specifically described above. For example, the elastic members may be any suitable members other than the tension springs. The balls 51a of the table support devices 35 may be supported for rotation on the alignment table 33 and may be kept in elastic contact with the support wall 43. The stepping motor 71, i.e., the actuator, and the follower roller 83, i.e., the rolling member, of each table moving device 37 may be supported on the alignment table 33 instead of on the support wall 43. Both the two contact members of each table moving device 37 may be rolling members. The vertical alignment table mechanism of the present invention is applicable not only to holding an exposure mask but also to holding various kinds of exposure implements, and need not necessarily be provided with the openings.

Although the invention has been described in its preferred embodiment with a certain degree of particularity, obviously many changes and variations are possible therein. It is therefore to be understood that the present invention may be practiced otherwise than as specifically described herein without departing from the scope and spirit thereof.

What is claimed is:

1. A vertical alignment table mechanism comprising:
   a vertical support wall;
   an alignment table disposed in a vertical attitude opposite to a front surface of the support wall, and having an exposure implement supporting region surrounded by a peripheral portion;
   a plurality of table support devices supporting the alignment table for movement in a vertical plane; and
   a plurality of table moving devices for moving the alignment table in directions parallel to two alignment directions perpendicular to each other;
   wherein each of the table support devices comprises an elastic member constantly biasing the alignment table toward the support wall, and a rolling member interposed between the support wall and the alignment table to allow the alignment table to move in said directions.

2. The vertical alignment table according to claim 1, wherein said rolling member is a ball held in a ball caster fixed to the support wall, and said alignment table has a contact block fixed thereto and having a surface with which the ball is in rolling contact.

3. The vertical alignment table according to claim 1, wherein said elastic member is a tension spring provided adjacent to the rolling member and connecting the alignment table with the support wall.

4. The vertical alignment table according to claim 3, wherein the support wall has a spring connecting member projecting from the support wall in a direction away from the alignment table, and one end of the tension spring is connected to the spring connecting member and the other end thereof is connected to the alignment table, the tension spring extending through a hole in the support wall.

5. The vertical alignment table mechanism according to claim 1, wherein each of the table moving devices comprises a pair of contact members attached to the support wall and the alignment table, respectively, so as to be in contact with each other, an elastic member urging the contact members in pressed contact with each other, and an actuator for moving one of the contact members toward and away from the other.

6. The vertical alignment table mechanism according to claim 5, wherein the actuator has an operating rod, and one of the contact members of each table moving device engages with a free end part of the operating rod of the actuator.

7. The vertical alignment table mechanism according to claim 5, wherein at least one of the contact members is a rolling member.

8. The vertical alignment table mechanism according to claim 5, wherein one of the contact members is a contact block fixed to one of the alignment table and the support wall, and the other of the contact members is a roller supported on the other of the alignment table and the support wall and in rolling contact with a surface of the contact block.

9. The vertical alignment table mechanism according to claim 5, wherein said actuator is a rotary motor mounted on one of the alignment table and the support wall and having an output shaft in the form of a threaded rod, and the other of the alignment table and the support wall has fixedly mounted thereon a nut which is in screw engagement with said threaded rod.

10. The vertical alignment table mechanism according to claim 9, wherein said elastic member for urging the contact members is a tension spring having two ends connected to the alignment table and the support wall, respectively.

11. The vertical alignment table mechanism according to claim 1, wherein the table support devices and the table moving devices are provided on said peripheral portion of the alignment table.

12. The vertical alignment table mechanism according to claim 1, wherein the table support devices and the table moving devices are disposed outside the exposure implement support region of the alignment table.

* * * * *